Jan. 31, 1933.  A. F. HEGENBERGER  1,895,510
SEXTANT FOR AIRCRAFT
Filed Dec. 16, 1930
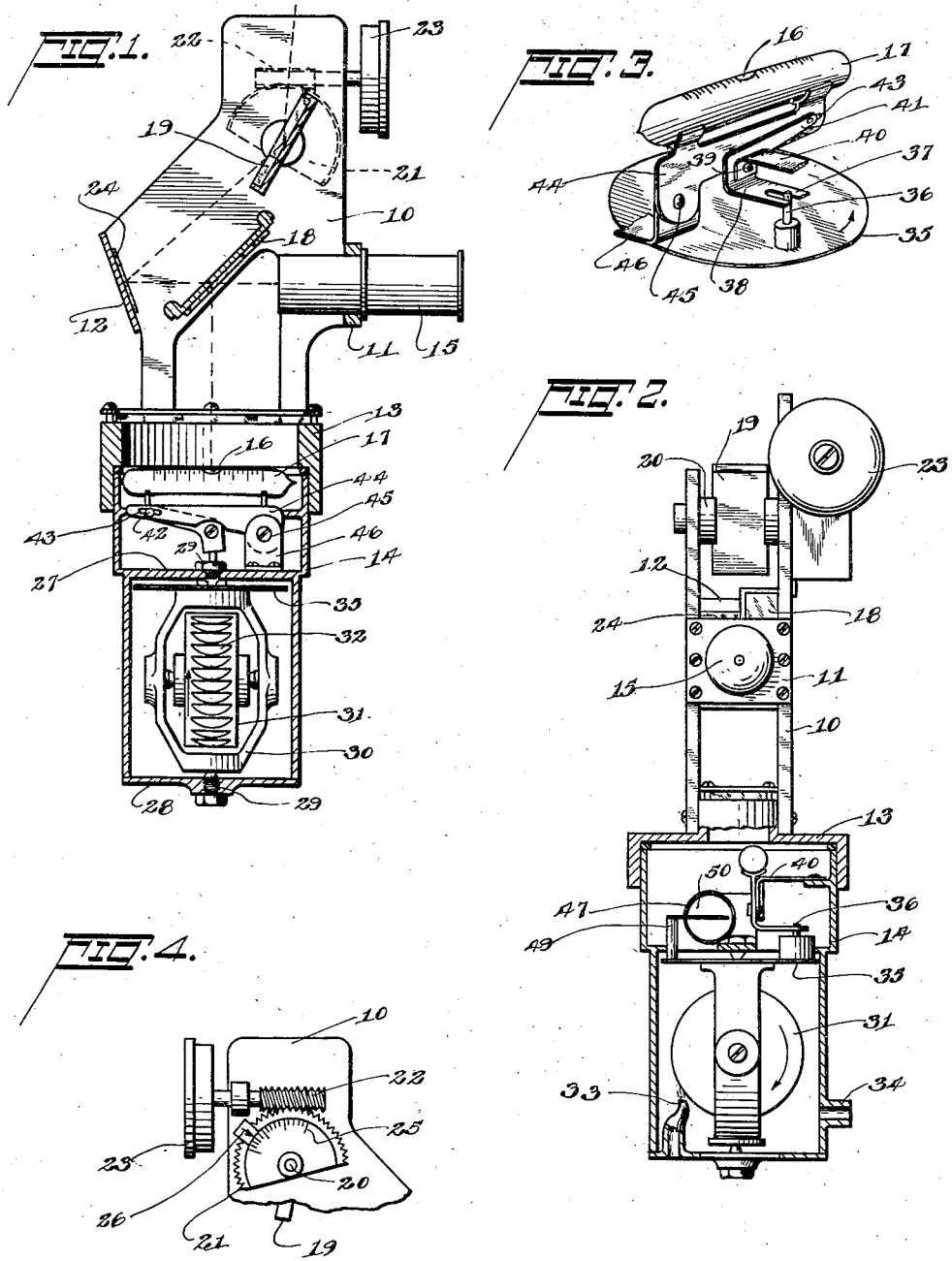
INVENTOR
Albert F. Hegenberger
BY Robert H. Young
ATTORNEY Patented Jan. 31, 1933

1,895,510

UNITED STATES PATENT OFFICE

ALBERT F. HEGENBERGER, OF DAYTON, OHIO

SEXTANT FOR AIRCRAFT

Application filed December 16, 1930. Serial No. 502,718.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to a sextant for aeronautical use, and is especially concerned with the provision of a gyroscopically-stabilized gravity-actuated artificial horizon for use in an instrument of this character. The invention however broadly contemplates the provision of such a standard of position for use in a wide variety of instruments using levels or the like as references.

In instruments used on aircraft, considerable difficulty is experienced in making observations and calculations where observations of a gravity-actuated standard are relied upon, due to the inertia effect of the mobile standard used in the instrument, which causes violent movements of the standard in the pitching and tossing in flight of the craft on which the instrument is in use. The present invention provides an element such as a gyroscope, affected by angular accelerations, connected with the reference to tilt or incline the same when the plane strikes an air pocket or an air current and is caused to rock momentarily. The tilting of the reference counteracts what movement might be induced in the mobile substance of the reference due to its inertia. In instruments such as that herein shown, where a gyroscope is used, the precessional movements of the gyroscope are made use of in making a correction on the reference.

The invention is illustrated in the accompanying drawing, in which:

Fig. 1 is a central vertical section through a sextant, incorporating my improvements.

Fig. 2 is a front view of the sextant with the lower part in section.

Fig. 3 is an isolated perspective detail of the connection between the gyroscope and the level used in the sextant as an artificial horizon.

Fig. 4 is a fragmentary elevational detail of the adjusting means for the adjustable mirror used in sighting the sun.

Throughout the views the same reference numerals are applied to the same parts.

The sextant in connection with which the present invention is described, is of that type which utilizes a so-called artificial horizon to enable the pilot of an aircraft to determine his position where it is undesirable or impossible to sight the true horizon and make the usual calculations by noting the position of the sun. An artificial horizon consisting of a level, a pendulum, a ball rolling on a concave surface, a gyro-pendulum, the reflecting surface of a mobile fluid, or, in short, any of the gravity actuated standards of position, horizontal or vertical, used heretofore in aeronautical instruments using standards of position did not take into consideration the movement of the mobile substance of the standard due to uneven flight of the plane and as a consequence, computations were made having a false reference to rely upon or a reference which was always in violent motion. The present invention obviates errors arising in this way by providing a gyroscope acted upon by the accelerations of the airplane and arranged to precess and in its precessional movement to give a tilt to the reference and counteract the tendency due to inertia for the mobile matter thereof to move.

The sextant comprises a frame 10 composed of two side members spaced by transverse braces 11 and 12 and secured at the lower extremities to a cover 14 on a casing 14. The casing 14 is of a size to permit holding the instrument in one hand while making an observation through a sight 15 supported in the cross piece 11. The image of a bubble 16 in a level tube 17 is seen in a mirror 18 in the right half of the sight opening. The tube 17 has a longitudinal upwardly convex contour of very large radius, and contains a suitable liquid and the air bubble 16, which, in the embodiment of my invention, serves as a reference or a gravity-actuated standard of position. A mirror 19 adjustable on trunnions 20 through the medium of a worm sector 21, worm 22, and knob 23, is adjusted to secure an image of the sun by reflection in the mirror 24 which is seen in the left half of the sight opening. The computation of latitude can be made when the instrument is held so that an image of the bubble 16 in its central position is seen alongside an image of the sun. The angle included between lines to the artificial horizon and to the sun is measured and may be read directly off a scale 25 provided suitably on sector 21 which moves relative to a stationary index 26 on the side of the frame member 10 when adjusted by turning the knob 23. This arrangement is in common use and reference is made thereto only because of the relationship with the details of the present invention which will be hereinafter described. It is obvious that any computation based upon a false artificial horizon due to the latter not being stabilized against effects of uneven flight of the plane cannot be accurate. It will presently appear how the tendency for the bubble 16 to move because of inertia effects is neutralized by a tilting of the level 17.

The casing 14 has a partition wall 27 parallel to the bottom 28 in which are mounted conical-ended pivot screws 29 for centering the frame 30 of a gyroscope fly wheel 31 for movement about a vertical axis in the casing 14. The fly wheel 31 has peripheral cavities or pockets 32 by which means the fly wheel is driven when a blast of air is directed tangentially to the fly wheel 31 by a nozzle 33 extending from the bottom 28 of the casing 14. An opening in a neck 34 opposite the nozzle 33 in the side wall of the casing 14 is suitably connected with a tube extending preferably to a venturi to continuously exhaust the air from the casing and draw in a blast through the nozzle 33 in an obvious manner. The wheel 31 is accurately balanced and of sufficient mass to afford an appreciable gyroscopic effect, and is arranged, when it precesses, to tilt the level 17. A disc 35 on the upper end of the gyroscope frame 30 has a pin 36 extending from a boss on the disc which operates in the forked end 37 of a bell crank 38 pivoted at 39 on a bracket 40 extending from the side wall of the casing 14. The other arm 41 of the bell crank 38 has a pin 42 operating in a slot 43 in one end of a cradle support 44 for the level tube 17. The opposite end of the cradle 44 is pivoted at 45 to a bracket 46 extending from the partition wall 27 in the casing 14.

The precessional movements of the gyroscope are suitably dampened by a dash-pot action in the cylinder 47. A stud 49 projecting from the top of the disc 35 has a suitable connection with a piston 50 operating in the cylinder 47.

In operation, the instrument is held in the aviator's hands to be sighted and the liquid in the tube is affected by the accelerations of the plane due to momentary pitching or diving. These accelerations occur even where the pilot concentrates his efforts on keeping the plane on an even straightaway when the observation is being made. This is due to air pockets and currents encountered in flight. A sudden and momentary nosing down for example, results in a sudden acceleration. The momentary nosing down occurs with an angular acceleration of the airplane. This angular acceleration instantly produces a lineal acceleration since, with the motor and propeller running at a constant speed the speed of the airplane increases as it is pointed down away from a level position. If a deflection of one degree occurs in the position of the airplane the inertia effect, due to accelerations, on the mass of a pendulum or level will cause the pendulum or level to show an indication of many times the actual tilt. Unless the airplane is kept absolutely level the bubble or pendulum will be in a constant state of movement due to inertia effects. It is the effect of these accelerations on the reference that the present invention is directed toward counteracting. In an ordinary bubble level tube, for example, an acceleration results in the liquid in the tube crowding to the back of the tube, due to inertia, and the bubble, as a consequence, moves forward. These accelerations are practically constantly occurring even though they may be so slight the aviator cannot sense them.

Assume that an observation is to be made and the instrument is brought into position so that an image of the bubble 16 is secured in a central poistion, the plane meanwhile being flown on a level course toward the sun. The mirror 19 is adjusted to secure an image of the sun alongside the bubble 16. The gyroscope is affected to the same degree as the reference by any angular accelerations and is caused to precess. Its precessional movement is utilized through the medium of the bell crank 38 the lengths of the arms of which are so designed as to tilt the support 44 and counteract the inertia effects producing a tendency for the bubble 16 to move. Thus an acceleration, due to a momentary nosing down of the plane, which would tend to cause the fluid in the tube 17 to crowd to the back of the tube and the bubble 16 to move forward, will result in the gyroscope precessing and rotating the disc 35 clockwise, viewing the same from the top in Fig. 3, assuming the gyroscope fly wheel 31 to rotate in the direction of the arrow shown in Fig. 2. This rotation of the disc 35 serves to lower the forward end of the tube 17, through the medium of the bell crank 38, as will be obvious from Fig. 3. The tendency for the bubble 16 to move forward, as induced by the inertia effects of the liquid, is therefore counteracted by a tendency for the bubble to move backward to obtain a higher level in the inclined tube. As a result, the momentary acceleration has no effect on the reference and the latitude reading can be taken with the assurance it is based on a true horizon.

I claim:—

1. In an instrument to be sighted through, the combination of a casing, a sight thereon, a level therein serving as a horizontal reference, a gyroscope having its frame mounted in said casing to pivot on a vertical axis and having the axis of the flywheel thereof directed to tilt in a plane approximately coincident with the plane of sight wherein said level tilts, and connections between said level and said gyroscope frame for tilting the latter in the precessional movements of said gyroscope.

2. In an apparatus for measuring the angle of elevation of a distant object with respect to the horizon, in combination, a reference object for establishing an artificial horizon and including a mobile part affected by accelerations, means for producing in a common focal plane an image of said distant object in one position of the field of vision, means for producing in said plane an image of said reference object in another portion of said field of vision, gyroscopic means associated with said reference object for moving said object to compensate for the accelerations on said mobile part, a rotatable reflector associated with said first-mentioned image producing means and means for measuring the angle of rotation of said reflector to indicate the angle between said distant object and said reference object.

3. In an apparatus for measuring the angle of elevation of a distant object with respect to the horizon, in combination, a gravity actuated reference object for establishing an artificial horizon, means for producing in a common focal plane an image of said distant object in one portion of the field of vision, means for producing in said plane an image of said reference object in another portion of said field of vision, gyroscopic means for stabilizing said reference object to overcome inertia effects thereon, a rotatable reflector associated with said first-mentioned image producing means and means for measuring the angle of rotation of said reflector to indicate the angle between said distant object and said reference object.

4. In an apparatus for measuring the angle of elevation of a distant object with respect to the horizon, in combination, a gyroscopically stabilized gravity actuated reference object for establishing an artificial horizon, means for producing in a common focal plane an image of said distant object in one portion of the field of vision, means for producing in said plane an image of said reference object in another portion of said field of vision, a rotatable reflector associated with said first-mentioned image producing means and means for measuring the angle of rotation of said reflector to indicate the angle between said distant object and said reference object.

5. In an apparatus for measuring the angle of elevation of a distant object with respect to the horizon, in combination, a tiltable reference object for establishing an artificial horizon having a part movable according to tilt and tending to move as a result of inertia, means for producing in a common focal plane an image of said distant object in one portion of the field of vision, means for producing in said plane an image of said reference object in another portion of said field of vision, means for tilting said reference object to effect a movement of said part in a direction opposed to the movement induced by inertia, a rotatable reflector associated with said first-mentioned image producing means and means for measuring the angle of rotation of said reflector to indicate the angle between said distant object and said reference object.

6. In an apparatus for measuring the angle of elevation of a distant object with respect to the horizon, in combination, a reference object for establishing an artificial horizon, means for producing in a common focal plane an image of said distant object in one portion of the field of vision, means for producing in said plane an image of said reference object in another portion of said field of vision, a gyroscope, connections between said reference object and said gyroscope to move said reference object in the precessional movements of said gyroscope, a rotatable reflector associated with said first-mentioned image producing means and means for measuring the angle of rotation of said reflector to indicate the angle between said distant object and said reference object.

7. In an apparatus for measuring the angle of elevation of a distant object with respect to the horizon, in combination, a reference object for establishing an artificial horizon and including mobile matter, means for producing in a common focal plane an image of said distant object in one portion of the field of vision, means for producing in said plane an image of said reference object in another portion of said field of vision, a gyroscope, mechanical connections between said reference object and said gyroscope to tilt said reference object in the precessional movements of said gyroscope to overcome the inertia effects of said mobile matter, a rotatable reflector associated with said first-mentioned image producing means and means for measuring the angle of rotation of said reflector to indicate the angle between said distant object and said reference object.

8. In an apparatus for measuring the angle of elevation of a distant object with respect to the horizon, in combination, a reference object for establishing an artificial horizon comprising a spirit level having mobile matter therein affected by inertia, means for producing in a common focal plane an image of said distant object in one portion of the field of vision, means for producing in said plane an image of said reference object in another portion of said field of vision, a member movable as the result of inertia effects upon said apparatus having connection with said spirit level to tilt the same to overcome the tendency for the mobile matter to move due to said inertia effects, a rotatable reflector associated with said first-mentioned image producing means and means for measuring the angle of rotation of said reflector to indicate the angle between said distant object and said reference object.

9. In an apparatus for measuring the angle of elevation of a distant object with respect to the horizon, in combination, a reference object for establishing an artificial horizon including mobile matter affected by inertia, means for producing in a common focal plane an image of said distant object in one portion of the field of vision, means for producing in said plane an image of said reference object in another portion of said field of vision, a gyroscope, a lever connected between said gyroscope and reference object to automatically incline the latter to overcome the inertia effects thereon, a rotatable reflector associated with said first-mentioned image producing means and means for measuring the angle of rotation of said reflector to indicate the angle between said distant object and said reference object.

10. In an apparatus for measuring the angle of elevation of a distant object with respect to the horizon, in combination, a reference object for establishing an artificial horizon including mobile matter effected by inertia, means for producing in a common focal plane an image of said distant object in one portion of the field of vision, means for producing in said plane an image of said reference object in another portion of said field of vision, a gyroscope, a bellcrank lever connected between said gyroscope and reference object to incline the latter where said gyroscope precesses, a rotatable reflector associated with said first-mentioned image producing means and means for measuring the angle of rotation of said reflector to indicate the angle between said distant object and said reference object.

11. In an apparatus for measuring the angle of elevation of a distant object with respect to the horizon, in combination, a reference object for establishing an artificial horizon including mobile matter effected by inertia, means for producing in a common focal plane an image of said distant object in one portion of the field of vision, means for producing in said plane an image of said reference object in another portion of said field of vision, a gyroscope mounted to turn about an axis in its precessional movements, means connected with said reference object having connection with said gyroscope to incline said reference object when said gyroscope precesses to overcome the inertia effects on said mobile matter, means to dampen the movements of said gyroscope, a rotatable reflector associated with said first-mentioned image producing means and means for measuring the angle of rotation of said reflector to indicate the angle between said distant object and said reference object.

12. In an apparatus for use on aircraft for measuring the angle of elevation of a distant object with respect to the horizon, in combination, a reference object for establishing an artificial horizon comprising a level having a plumb element movable back and forth in tilting said apparatus adapted for manipulation to a true horizontal position but tending to move in the pitching and tossing of said aircraft, means to correct for the pitching and tossing of said aircraft to keep said level free of the effect of the movements of said aircraft, means for producing in a common focal plane an image of said distant object in one portion of the field of vision, means for producing in said plane an image of said reference object in another portion of said field of vision, a rotatable reflector associated with said first-mentioned image producing means and means for measuring the angle of rotation of said reflector to indicate the angle between said distant object and said reference object.

In testimony whereof I affix my signature.

ALBERT F. HEGENBERGER.